(12) United States Patent
Kuo et al.

(10) Patent No.: US 10,168,743 B2
(45) Date of Patent: Jan. 1, 2019

(54) CASING AND FRAME FOR TOUCH DISPLAY APPARATUS

(71) Applicants: INTERFACE OPTOELECTRONIC (SHENZHEN) CO., LTD., Shenzhen (CN); GENERAL INTERFACE SOLUTION LIMITED, Miaoli County (TW)

(72) Inventors: Yu-Chen Kuo, Hsinchu (TW); Kuo-Tung Liao, Hsinchu (TW); Chia-Jung Fan, Hsinchu (TW)

(73) Assignees: INTERFACE OPTOELECTRONIC (SHENZHEN) CO., LTD., Shenzhen (CN); GENERAL INTERFACE SOLUTION LIMITED, Zhubei (TW)

( * ) Notice: Subject to any disclaimer, the term of this patent is extended or adjusted under 35 U.S.C. 154(b) by 218 days.

(21) Appl. No.: 14/886,528

(22) Filed: Oct. 19, 2015

(65) Prior Publication Data
US 2016/0306394 A1    Oct. 20, 2016

(30) Foreign Application Priority Data
Apr. 15, 2015    (CN) .......................... 2015 1 0177212

(51) Int. Cl.
G06F 1/16    (2006.01)
G06F 3/041    (2006.01)
G02F 1/1333    (2006.01)

(52) U.S. Cl.
CPC .......... *G06F 1/1656* (2013.01); *G06F 1/1626* (2013.01); *G06F 1/1637* (2013.01); *G06F 1/1643* (2013.01); *G02F 1/133308* (2013.01); *G06F 3/0412* (2013.01); *G06F 2203/04103* (2013.01)

(58) Field of Classification Search
CPC ......... G06F 3/0412; G06F 2203/04103; G06F 1/1656; G06F 1/1643; G06F 1/1626; G06F 1/1637; G06F 1/1601; B32B 2457/208; B32B 7/12; H01L 51/5246; G02F 2202/28; G02F 1/13338; G02F 2001/133311; G02F 2001/133317; G02F 2001/13332; G02F 2001/133322; G02F 2001/133325; G02F 2001/133328; G02F 2001/133331
See application file for complete search history.

(56) References Cited

U.S. PATENT DOCUMENTS

| 8,060,168 | B2 * | 11/2011 | Horrdin | G06F 1/1616 29/729 |
| 8,564,950 | B2 * | 10/2013 | Rayner | G06F 1/1626 206/320 |
| 9,268,165 | B2 * | 2/2016 | Lin | G06F 1/1601 |
| 9,310,845 | B2 * | 4/2016 | Dabov | G06F 1/1626 |
| 9,616,625 | B2 * | 4/2017 | Allore | B29D 11/00009 |
| 9,703,135 | B2 * | 7/2017 | Hsiao | G02F 1/13338 |

(Continued)

*Primary Examiner* — Darlene M Ritchie
(74) *Attorney, Agent, or Firm* — ScienBiziP, P.C.

(57) ABSTRACT

A robust touch display apparatus utilizing adhesive as a shock absorber includes a cover lens, a touch module disposed under the cover lens, a display module disposed on a surface of the touch module away from the cover lens, a casing, and a protection frame. The casing receives the cover lens and supports the touch module and the display module. The protection frame is fixed on an outside surface of the casing. The protection frame faces a sidewall of the cover lens and the touch module.

6 Claims, 5 Drawing Sheets

(56) References Cited

U.S. PATENT DOCUMENTS

| | | | |
|---|---|---|---|
| 2004/0209646 A1* | 10/2004 | Murayama | G06F 1/1616 455/556.1 |
| 2009/0302760 A1* | 12/2009 | Tchakarov | H01L 51/5203 313/512 |
| 2011/0235364 A1* | 9/2011 | Lo | G02F 1/133308 362/611 |
| 2012/0162087 A1* | 6/2012 | Hou | G06F 1/1626 345/173 |
| 2012/0223896 A1* | 9/2012 | Tseng | G06F 3/041 345/173 |
| 2012/0250284 A1* | 10/2012 | Abe | G06F 1/1637 361/807 |
| 2012/0314354 A1* | 12/2012 | Rayner | H01H 13/06 361/679.01 |
| 2013/0003270 A1* | 1/2013 | Kim | G06F 1/1626 361/679.01 |
| 2013/0010411 A1* | 1/2013 | Wu | G09F 9/30 361/679.01 |
| 2013/0057804 A1* | 3/2013 | Kuo | G06F 1/1601 349/60 |
| 2013/0093697 A1* | 4/2013 | Sun | G06F 3/044 345/173 |
| 2013/0140965 A1* | 6/2013 | Franklin | G06F 1/1626 312/223.1 |
| 2013/0241402 A1* | 9/2013 | Wang | H05B 33/04 313/504 |
| 2013/0321293 A1* | 12/2013 | Park | G06F 3/041 345/173 |
| 2013/0329395 A1* | 12/2013 | Tsai | F21V 15/01 362/19 |
| 2013/0335644 A1* | 12/2013 | Horii | H04N 5/64 348/836 |
| 2014/0036458 A1* | 2/2014 | Sato | H05K 7/02 361/749 |
| 2014/0118985 A1* | 5/2014 | Hassember | G02F 1/133526 361/814 |
| 2014/0152890 A1* | 6/2014 | Rayner | G06F 1/1626 348/376 |
| 2014/0160694 A1* | 6/2014 | Yoon | G02F 1/1303 361/749 |
| 2015/0070287 A1* | 3/2015 | Ojala | G06F 3/0414 345/173 |
| 2015/0212579 A1* | 7/2015 | Nakamura | G06F 1/1626 345/173 |
| 2015/0234434 A1* | 8/2015 | Lin | G06F 1/1601 345/173 |
| 2015/0241931 A1* | 8/2015 | Carnevali | G06F 1/181 361/679.41 |
| 2016/0188093 A1* | 6/2016 | Kim | F25D 29/005 345/173 |
| 2016/0212872 A1* | 7/2016 | Pakula | G06F 1/1626 |
| 2016/0266690 A1* | 9/2016 | Ahn | G06F 3/0412 |
| 2017/0177106 A1* | 6/2017 | Kihara | G06F 3/041 |
| 2017/0363798 A1* | 12/2017 | Hirayama | G02B 6/0036 |

* cited by examiner

CASING AND FRAME FOR TOUCH DISPLAY APPARATUS

CROSS-REFERENCE TO RELATED APPLICATIONS

This application claims priority to Chinese Patent Application No. 201510177212.1 filed on Apr. 15, 2015, the contents of which are incorporated by reference herein.

FIELD

The present disclosure relates to a touch display apparatus.

BACKGROUND

Electronic devices, such as mobile phones or tablet computers, include a touch display module. The touch display module includes a touch panel, a display panel, a cover lens, and a frame. The touch panel, the display panel, and the cover lens are received in the frame. The cover lens covers the touch panel and the display panel. The touch panel senses a touch operation on the touch display module. The display panel displays images. The cover lens protects the touch panel and the display panel.

BRIEF DESCRIPTION OF THE FIGURES

Implementations of the present technology will now be described, by way of example only, with reference to the attached figures.

DETAILED DESCRIPTION

Figure 1:
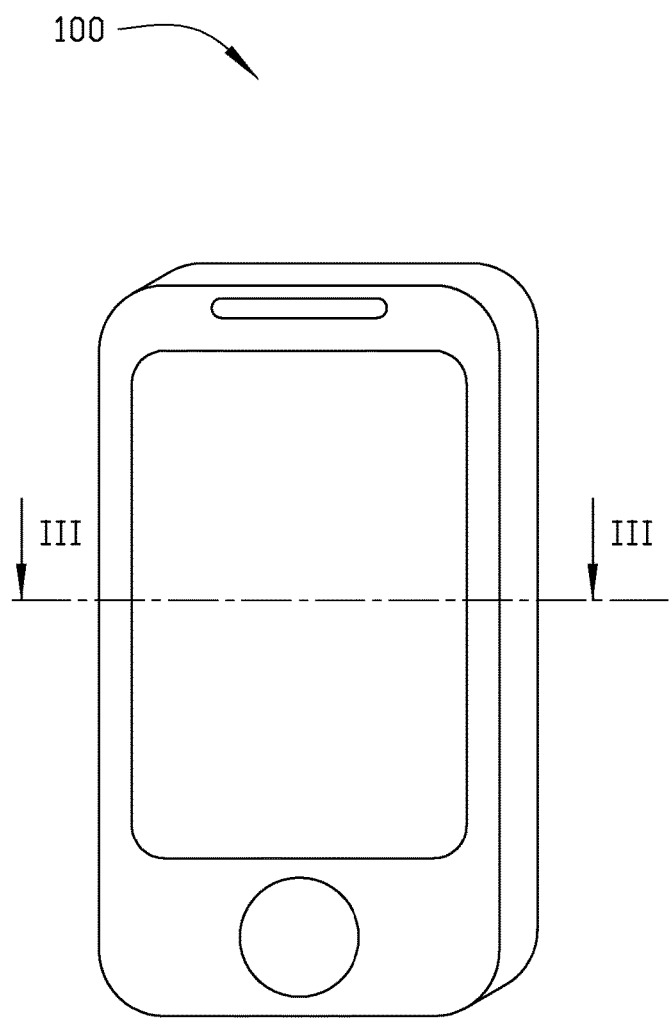
FIG. 1 is an isometric view of an embodiment of a touch display apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 illustrates an embodiment of a touch display apparatus 100. In at least one embodiment, the touch display apparatus 100 is a mobile phone with embedded touch display panel.

Figure 2:
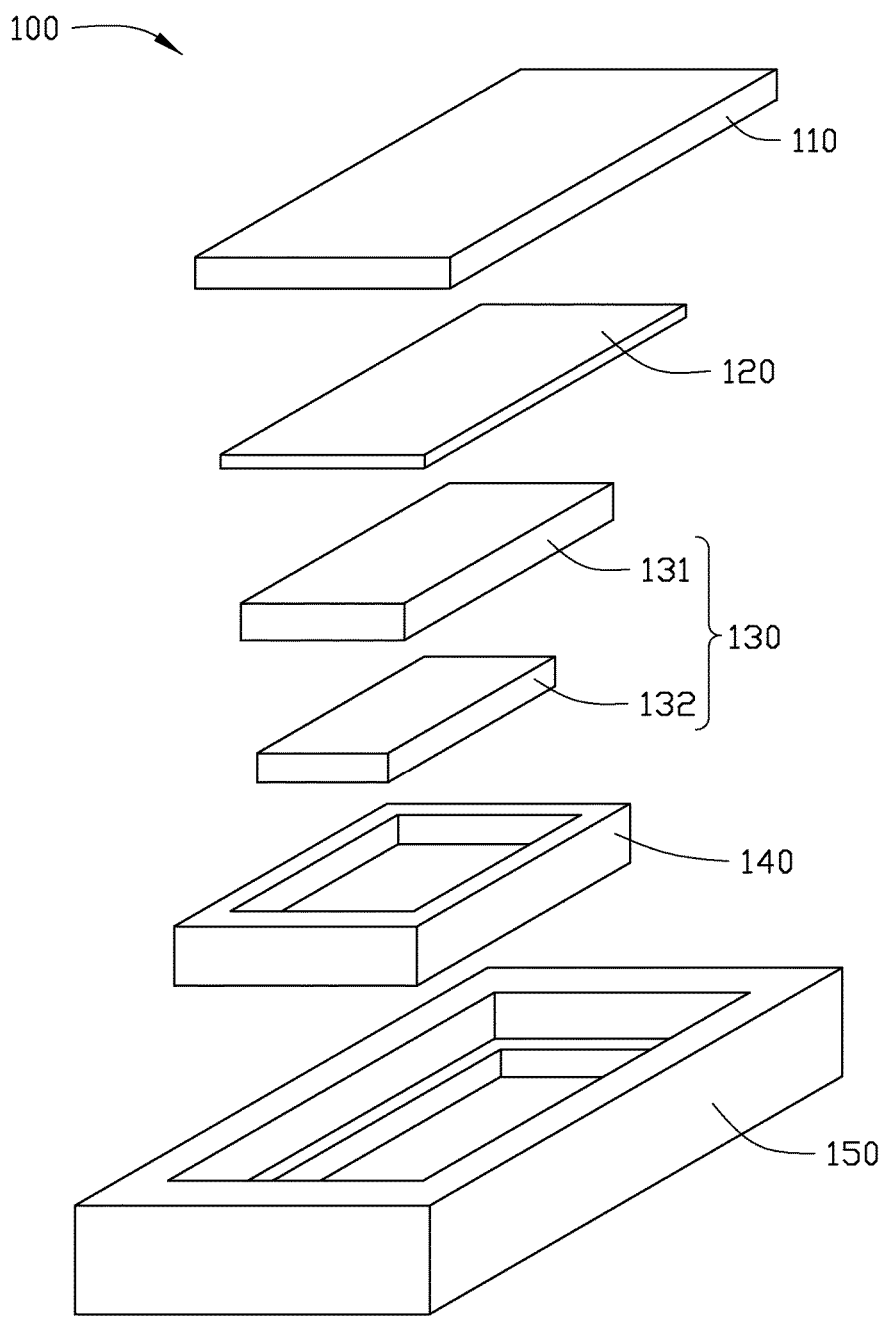
FIG. 2 is an exploded, isometric view of an embodiment of the touch display apparatus of FIG. 1.

FIG. 2 illustrates an embodiment of the touch display apparatus 100. The touch display apparatus 100 includes a cover lens 110, a touch module 120, a display module 130, a casing 140, a protection frame 150, an adhesive component 160, and an adhesive layer 170. The cover lens 110 protects the touch module 120 and the display module 130. The touch module 120 is located under the cover lens 110. The touch module 120 senses touches and generates touch signals for controlling the touch display apparatus 100 to execute a function based on the sensed touch. The display module 130 is disposed on a surface of the touch module 120 away from the cover lens 110. The touch module 120 is attached on the display module 130 via the adhesive layer 170. The casing 140 receives the touch module 120, and supports the display module 130 and the cover lens 110. The protection frame 150 is attached on a side surface of the casing 140 via the adhesive component 160. The display module 130 includes a display panel 131 and a backlight module 132 under the display panel. The backlight module 132 provides lighting to the display panel 131. In at least one embodiment, the cover lens 110 is made of glass.

The display module 130 is a liquid crystal module. The adhesive component 160 is transparent or opaque and of material such as optical clear resin (OCR), optical clear adhesive (OCA), and thermosetting adhesive. In other embodiments, the display module 130 can be an organic lighted-emitting diode module. The cover lens 110 can also be made of resin.

Figure 3:
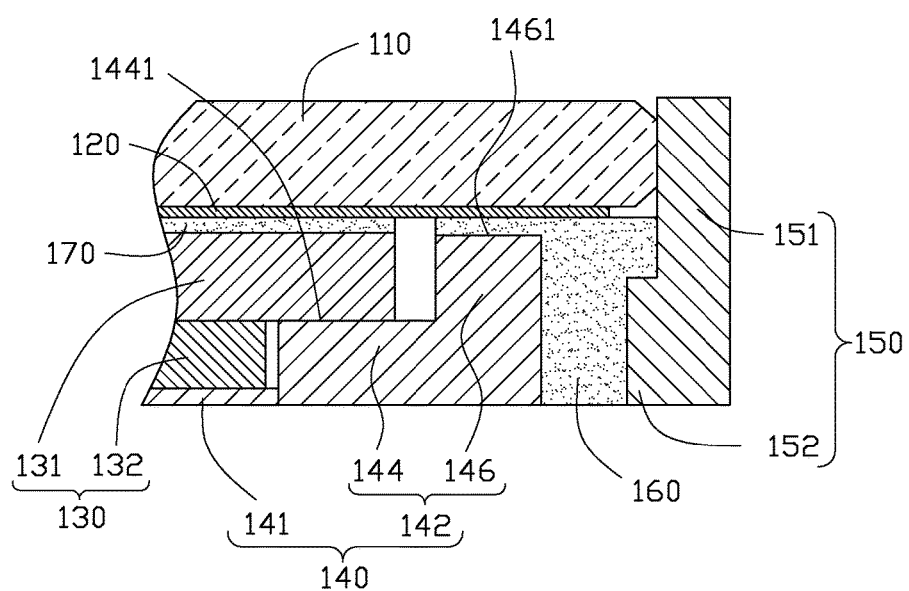
FIG. 3 is a cross-sectional partial view of a first embodiment of the touch display apparatus of FIG. 1, taken along a line III-III thereof.

FIG. 3 illustrates a first embodiment of the touch display apparatus 100. The casing 140 includes a back cover 141 and a casing frame 142. The back cover 141 supports the display module 130. The casing frame 142 cooperates with the back cover 141 to define a receiving space for receiving the display module 130. The casing frame 142 supports the cover lens 110 and the touch module 120. The casing frame 142 includes a resisting portion 144 and a supporting portion 146. The resisting portion 144 is parallel with the display module 130 is fixed with the back cover 141. The resisting portion 144 includes a first surface 1441 for supporting the display module 130. The supporting portion 146 perpendicularly extends from an end of the resisting portion 141. The supporting portion 146 is substantially a hollow frame. The supporting portion 146 includes a second surface 1461 for supporting the touch module 120. In at least one embodiment, a space between the second surface 1461 and the touch module 120 is filled with the adhesive component 160 for adhering the supporting portion 146 and the touch module 120 together. The back cover 141 is integrally formed with the casing frame 142.

The protection frame 150 with the casing frame 142 attached is located beside the casing 140, and perpendicularly extends away the casing 140, to face a sidewall of the cover lens 110 and the touch module 120. The protection frame 150 includes a main body 151 and an extending portion 152. A side surface of the main body 151 resists against the cover lens 110. A portion of the main body 151 is covered with the adhesive component 160. The extending portion 152 perpendicularly extends from the main body 151 towards to the frame 142. A space between the casing frame 142 and a surface of the extending portion 152 which faces the casing frame 142 is filled with the adhesive component 160. The extending portion 152 is located below the touch module 120, and attached with the casing frame 142 via the adhesive component 160. A resilience of the protection frame 150 is greater than that of the casing frame 142. In at least one embodiment, the protection frame 150 is made of flexible material. A cross-section of the protection frame 150 is substantially "L" shaped. In other embodiments, a cross-section of the protection frame 150 can be other shapes.

Based on the structure of the protection frame 150 adhesively attached with the casing 140 and the touch module 120 via the adhesive component 160, a side surface of the touch display apparatus 100 is protected against damage from impacts, and dust is prevented from entering the touch display apparatus 100.

Figure 4:
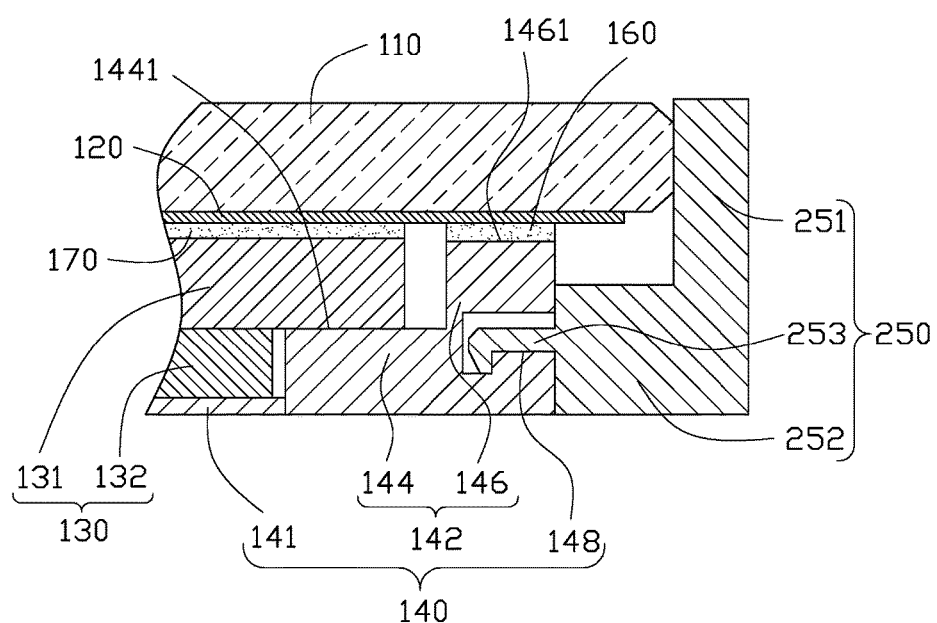
FIG. 4 is a cross-sectional partial view of a second embodiment of the touch display apparatus of FIG. 1, taken along a line III-III thereof

FIG. 4 illustrates a second embodiment of the touch display apparatus 100. The touch display apparatus 100 includes a cover lens 110, a touch module 120, a display module 130, a casing 140, a protection frame 250, an adhesive component 160, and an adhesive layer 170. The cover lens 110 protects the touch module 120 and the display module 130. The touch module 120 is located under the cover lens 110. The touch module 120 senses touches, and generates touch signals for controlling the touch display apparatus 100 to execute a function based on the sensed touch. The display module 130 is disposed on a surface of the touch module 120 away from the cover lens 110. The touch module 120 is attached on the display module 130 via the adhesive layer 170. The casing 140 receives the display module 130, and supports the touch module 120 and the cover lens 110. The protection frame 250 is fixed to a side surface of the casing 140. The display module 130 includes a display panel 131 and a backlight module 132 under the display panel 131. The backlight module 132 provides lighting to the display panel 131. In at least one embodiment, the cover lens 110 is made of glass. The display module 130 is a liquid crystal module. The adhesive layer 170 is transparent or opaque, and made of material such as OCR, OCA, thermosetting adhesive, and so on. In other embodiments, the display module 130 can be an organic light-emitting diode module. The cover lens 110 can also be made of resin.

The casing 140 includes a back cover 141 and a casing frame 142. The back cover 141 supports the display module 130. The casing frame 142 cooperates with the back cover 141 to define a receiving space for receiving the display module 130. The casing frame 142 supports the cover lens 110 and the touch module 120. The casing frame 142 includes a resisting portion 144 and a supporting portion 146. The resisting portion 144 is parallel with the display module 130 and fixed with the back cover 141. The resisting portion 144 includes a first surface 1441 for supporting the display module 130. The supporting portion 146 perpendicularly extends from an end of the resisting portion 144. The supporting portion 146 is substantially a hollow frame. The supporting portion 146 includes a second surface 1461 for supporting the touch module 120 and a receiving cavity 148. The receiving cavity 148 is defined at a sidewall of the supporting portion 146 facing the protection frame 250. The receiving cavity 148 cooperates with the protection frame 250 for fixing the protection frame 250 with the casing 140. In at least one embodiment, a space between the second surface 1461 and the touch module 120 is filled with the adhesive component 160 for fixing the supporting portion 146 and the touch module 120 together. The back cover 141 is integrally formed with the casing frame 142.

The protection frame 250 fixed on the casing frame 142 is located beside the casing 140, and perpendicularly extends away the casing 140 to face a sidewall of the cover lens 110 and the touch module 120. The protection frame 250 includes a main body 251, an extending portion 252, and a hook 253. A side surface of the main body 251 faces the cover lens 110, the touch module 120, and the supporting portion 146. The extending portion 252 perpendicularly extends from an end of the main body 251 towards to the casing frame 142. The extending portion 252 is located below the touch module 120. The hook 253 perpendicularly extends from a surface of the extending portion 252 facing the frame 142. The hook 253 bends away from the touch module 120. The hook 253 engages with the receiving cavity 148 to hook the protection frame 250 together with the casing 140. A resilience of the protection frame 250 is greater than that of the frame 142. In at least one embodiment, the protection frame 250 is made of flexible material. A cross-section of the protection frame 250 is substantially "L" shaped. In other embodiments, a cross-section of the protection frame 250 can be other shapes.

Based on the structure of the protection frame 250 adhering to the casing 140 and the touch module 120 via the adhesive component 160, a side surface of the touch display apparatus 100 is protected when impacts are suffered, and dust is prevented from entering the touch display apparatus 100.

Figure 5:
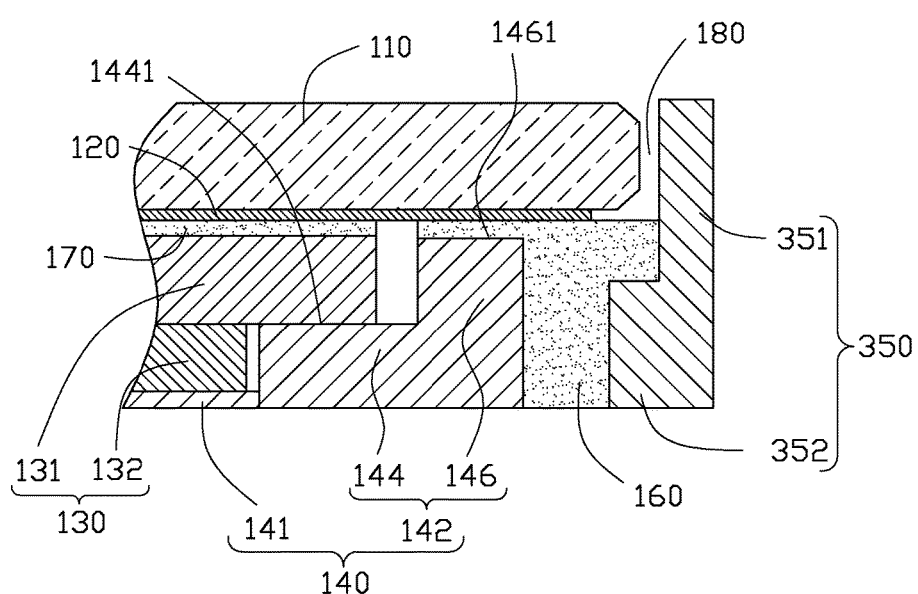
FIG. 5 is a cross-sectional partial view of a third embodiment of the touch display apparatus of FIG. 1, taken along a line III-III thereof.

FIG. 5 illustrates a third embodiment of the touch display apparatus 100. The touch display apparatus 100 includes a cover lens 110, a touch module 120, a display module 130, a casing 140, a protection frame 350, an adhesive component 160, and an adhesive layer 170. The cover lens 110 protects the touch module 120 and the display module 130. The touch module 120 is located under the cover lens 110. The touch module 120 senses touches, and generates touch signals for controlling the touch display apparatus 100 to execute a function based on the sensed touch. The display module 130 is disposed on a surface of the touch module 120 away from the cover lens 110. The touch module 120 is attached on the display module 130 via the adhesive layer 170. The casing 140 receives the touch module 120, and supports the display module 130 and the cover lens 110. The protection frame 350 is adhered to a side surface of the casing 140 via the adhesive component 160. The display module 130 includes a display panel 131 and a backlight module 132 under the display panel. The backlight module 132 provides lighting to the display panel 131. In at least one embodiment, the cover lens 110 is made of glass. The display module 130 is a liquid crystal module. The adhesive component 160 is transparent or opaque, and made of material such as OCR, OCA, thermosetting adhesive, and so on. In other embodiments, the display module 130 can be an organic light-emitting diode module. The cover lens 110 can also be made of resin.

The casing 140 includes a back cover 141 and a casing frame 142. The back cover 141 supports the display module 130. The casing frame 142 cooperates with the back cover 141 to define a receiving space for receiving the display module 130. The casing frame 142 supports the cover lens 110 and the touch module 120. The casing frame 142 includes a resisting portion 144 and a supporting portion 146. The resisting portion 144 is parallel with the display module 130 and fixed with the back cover 141. The resisting portion 144 includes a first surface 1441 for supporting the display module 130. The supporting portion 146 perpendicularly extends from an end of the resisting portion 141. The supporting portion 146 is substantially a hollow frame. The supporting portion 146 includes a second surface 1461 for supporting the touch module 120. In at least one embodiment, a space between the second surface 1461 and the touch module 120 is filled with the adhesive component 160 for adhering together the supporting portion 146 and the touch module 120. The back cover 141 is integrally formed with the casing frame 142.

The protection frame 350 attached with the casing frame 142 is located beside the casing 140, and perpendicularly extends away the casing 140 to face a sidewall of the cover lens 110 and the touch module 120. The protection frame 350 includes a main body 351 and an extending portion 352. A portion of the main body 351 bears the adhesive component 160. The extending portion 352 perpendicularly extends from the main body 351 towards the casing frame 142. A space between the casing frame 142 and a surface of the extending portion facing the casing frame 142 is filled with the adhesive component 160. The extending portion 352 is located below the touch module 120, and adhered to the casing frame 142 via the adhesive component 160. A space 180 is located between the main body 351 and the cover lens 110. A resilience of the protection frame 350 is greater than that of the casing frame 142. In at least one embodiment, the protection frame 350 is made of flexible material. A cross-section of the protection frame 350 is substantially "L" shaped. A width of the extending portion 352 is related to a width of the space 180. When the width of the extending portion 352 is increased, the width of the space 180 is also increased. In other embodiments, a cross-section of the protection 350 can be other shapes.

Based on the structure of the protection frame 350 adhesively adhered to the casing 140 and the touch module 120 via the adhesive component 160, a side surface of the touch display apparatus 100 is protected against damage from impacts, and dust is prevented from entering the touch display apparatus 100.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims.

What is claimed is:

1. A touch display apparatus comprising:
a cover lens;
a touch module disposed under the cover lens, the touch module defines a touch sensing area;
a display module disposed on a lower surface of the touch module away from the cover lens;
a casing, the casing comprising a resisting portion, a back cover and a supporting portion extending from and perpendicular to the resisting portion, the resisting portion is parallel with the display module and is fixed with the back cover, the resisting portion and an inner side surface of the supporting portion cooperatively forming a receiving space configured for receiving the display module, and an upper surface of the supporting portion spaced apart from the display module and supporting the touch module and the cover lens; and
a protection frame, the protection frame fixed to an outside surface of the supporting portion away from the display module and covering a sidewall of the cover lens and the touch module;
wherein a receiving cavity is defined in the outside surface of the supporting portion away from the display module, the receiving cavity extends from the outside surface of the supporting portion towards the display module; a hook protrudes from a surface of the protection frame facing the supporting portion and is engaged in the receiving cavity to hook the protection frame together with the casing; the hook extends underneath the touch module and is overlapped with the touch module along a thickness direction of the touch display apparatus; the hook is in the touch sensing area; wherein the hook bends away from the touch module toward the back cover;
wherein a resilience of the protection frame is greater than a resilience of the casing.

2. The touch display apparatus of claim 1, further comprising an adhesive component; wherein the adhesive component is located between the casing and the touch module to bond the casing and the touch module together.

3. The touch display apparatus of claim 2, wherein an adhesive layer is located between the display module and the touch module to bond the display module and the touch module together; the adhesive layer is spaced apart from the adhesive component.

4. The touch display apparatus of claim 1, wherein the protection frame comprises a main body and an extending portion; a side surface of the main body faces the cover lens, the touch module, and the supporting portion; the extending portion extends from the main body towards the casing and is perpendicular to the main body; the hook extends from and is perpendicular to a surface of the extending portion facing the casing.

5. The touch display apparatus of claim 4, wherein the hook bends away from the touch module.

6. The touch display apparatus of claim 4, wherein the supporting portion and the extending portion are under the cover lens, and both are overlapped with the cover lens along a thickness direction of the cover lens.

* * * * *